United States Patent [19]

Sardou

[11] Patent Number: 4,883,289
[45] Date of Patent: Nov. 28, 1989

[54] AXLE ASSEMBLY FOR A MOTOR VEHICLE

[75] Inventor: Max A. Sardou, Arpajon, France

[73] Assignee: Thor S.A., Saint-Soupplets, France

[21] Appl. No.: 253,466

[22] Filed: Oct. 5, 1988

[30] Foreign Application Priority Data

Dec. 17, 1987 [FR] France .............................. 87 17625
Jan. 27, 1988 [FR] France .............................. 87 00912
Oct. 5, 1988 [FR] France .............................. 87 13709

[51] Int. Cl.[4] ...................... B60G 11/20; B60B 37/10; F16F 1/16
[52] U.S. Cl. .................................. 280/684; 280/723; 267/273
[58] Field of Search ............... 280/113, 721, 723, 687, 280/683, 676, 684; 267/188, 273, 148, 154

[56] References Cited

U.S. PATENT DOCUMENTS 2,613,954 10/1952 Avila .................................. 267/273
3,498,631 3/1970 Van Winsen ..................... 280/723
3,722,908 3/1973 Whitley, Jr. ..................... 280/723

FOREIGN PATENT DOCUMENTS 2445825 4/1975 Fed. Rep. of Germany ...... 267/273

Primary Examiner—Charles A. Marmor
Assistant Examiner—Tamara L. Finlay
Attorney, Agent, or Firm—Sughrue, Mion, Zinn, Macpeak & Seas

[57] ABSTRACT

An axle assembly for a vehicle includes a chassis (1) and at least two wheels (2, 3) suitable for coming into contact with ground (4). A unit beam (5) associates the two wheels with the chassis and holds them in two substantially parallel planes (6, 7). A point (10) situated substantially between the two ends (11, 12) of the beam is prevented from rotating relative to the chassis. Two arms (13, 14) are fixed substantially at one of their ends to the end of respective beams. The two wheels are rotatably mounted to the opposite ends of the arms. The two portions (36, 37) of the beam (8) situated on opposite sides of the point situated between the two ends of the beam are made of a material such that each of them has anisotropic torsion elasticity (42, 43) in the opposite direction to the other.

29 Claims, 5 Drawing Sheets

AXLE ASSEMBLY FOR A MOTOR VEHICLE

The present invention relates to axle assemblies for motor vehicles such as cars, trucks, or the like.

BACKGROUND OF THE INVENTION

At present, the axle assembly of a motor vehicle comprises, in most cases, and particularly for trucks, a set of components constituted by a bar which is rigid and solid and therefore very heavy, two journals or stub axles situated at the two ends of the bar and serving to support various components such as drums, brakes, etc., and means for providing connection with the ground, e.g. pneumatic tires mounted on wheel rims. Such axle assemblies also includes springs and shock absorbers connected in parallel between the bar and the vehicle chassis.

In contrast, for cars which are lighter, there exists means referred to by persons skilled in the art as "torsion bar axles", which are constituted, roughly speaking, by cranks, one per wheel. They are generally made of steel and are bulky and do not really give satisfaction.

The aim of the present invention is to mitigate some of the above-mentioned drawbacks, and in particular to provide axle assemblies for motor vehicles which are suitable both for light vehicles such as cars and for heavy vehicles such as trucks, earth moving equipment, or the like, regardless of their applications and/or purposes, and which are simultaneously lightweight, compact, and at least as effective as the above-described prior art type of axle assembly.

SUMMARY OF THE INVENTION

More precisely, the present invention provides an axle assembly for a vehicle including a chassis, at least two wheels suitable for coming into contact with ground, and means for associating said two wheels with said chassis and for holding them in two substantially parallel planes, said means comprising a unit beam, means for preventing a point situated substantially between the two ends of the beam for rotating relative to said chassis, two arms, means for fixing each arm substantially at one of its ends to a respective one of the two ends of the beam, and means at the opposite ends of said arms for rotatably mounting a respective one of said two wheels, wherein the two portions of the beam lying on either side of said point situated between the two ends of the beam are made of a material such that each of them has anisotropic torsion elasticity in the opposite direction to the other.

BRIEF DESCRIPTION OF THE DRAWINGS

Embodiments of the invention are described by way of example with reference to the accompanying drawings, in which.

MORE DETAILED DESCRIPTION

Figure 1:
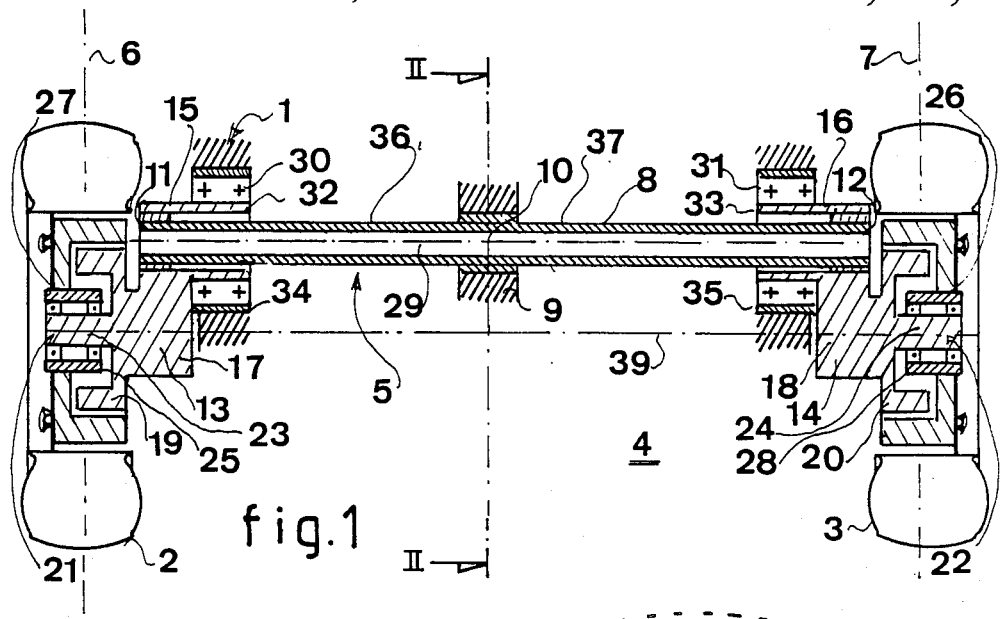
FIGS. 1 and 2 are respective sections on two perpendicular planes, seen from above and from the side, showing a particular embodiment of an axle assembly in accordance with the invention, with the section of FIG. 1 being referenced I—I in FIG. 2 and with a section of FIG. 2 being referenced II—II in FIG. 1.
Figure 2:
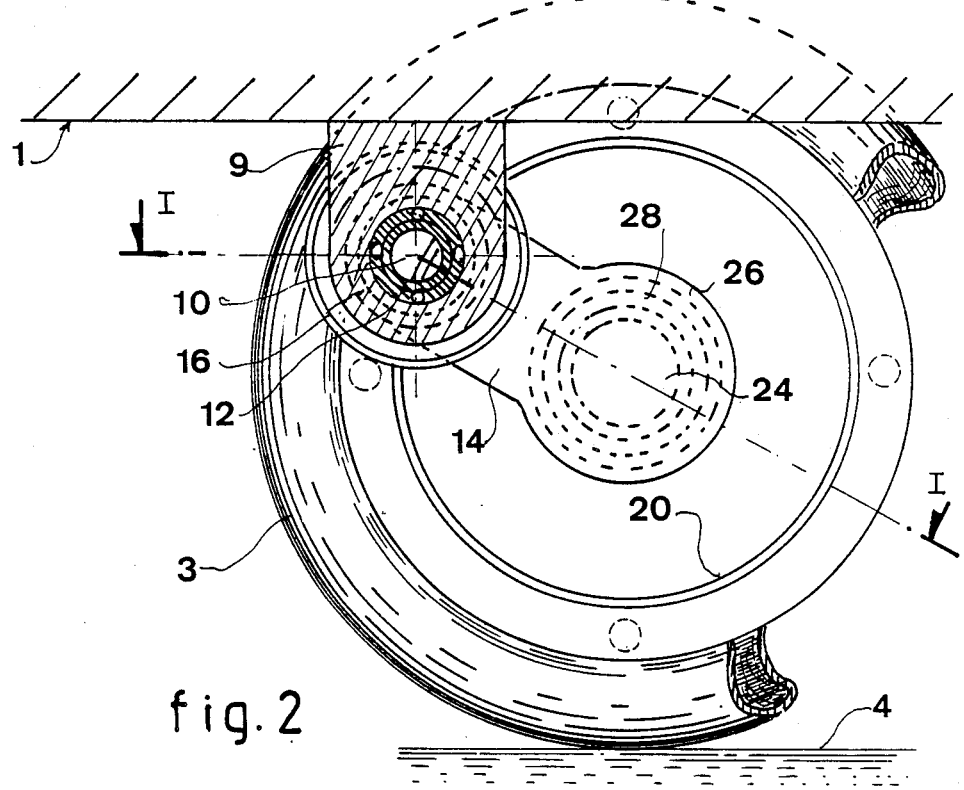

FIGS. 1 and 2 show an embodiment of an axle assembly, e.g. for a truck. This assembly comprises a chassis 1, two wheels 2 and 3 suitable for coming into contact with ground 4, and means 5 for associating the two wheels 2 and 3 with the chassis 1 and for maintaining them in two substantially parallel planes 6 and 7.

These means 5 for associating the two wheels 2 and 3 with the chassis and for maintaining them in the two planes 6 and 7 comprise a unit beam 8, i.e. a continuous beam, i.e. a beam made all in one piece or as a plurality of pieces which are subsequently assembled end-to-end. The means 5 also comprise means 9 for fixing said beam 8 at least with respect to rotation relative to the chassis at a point 10 situated between its two ends 11 and 12, said point being situated substantially in the middle of the beam in order to obtain a uniform axle assembly functioning symmetrically, if only for purposes of driving safety in a vehicle including such an assembly. At each of its two ends 11 and 12, the assembly further includes respective arms 13 and 14.

Each of the two arms has one end 15 or 16 fixed to a respective one of the two ends 11 and 12 of the beam 8, and the two wheels are rotatably mounted to respective second ends 17 and 18 of the arms.

In the embodiment shown, the means for providing a rotary wheel mount on each arm are constituted by drum brake segment carriers 19 or 20 connected to the corresponding end 17 or 18 of one of the arms about an axis 21 or 22 constituting the central portion 23 or 24 of a bearing 25 or 26, e.g. a ball bearing or the like, with the wheel being fixed to the outer ring 27 or 28 thereof. In a different practical embodiment, the end of the arm could be connected to a disk brake clamp support. Since such means are known per se, they are not described in greater detail herein.

However, depending on the material from which the beam is made, it may be advantageous for the assembly to further include means for maintaining the two ends 11 and 12 of the beam substantially on an axis 29 which is fixed relative to the chassis 1.

These means for maintaining the two ends of the beam on the axis 29 which is fixed relative to the chassis 1 may comprise at each end, a bearing of the ball bearing type 30 or 31, or even a smooth bearing or the like, with the inside ring 32 or 33 of the bearing being fixed to the end 11 or 12 of the beam or to the end 15 or 36 of the arm, and with the outer ring 34 or 35 being fixed to the chassis 1. FIG. 1 shows one embodiment of such means for holding the ends of the beam. However, it is possible for the beam to directly constitute the central portion of the bearing, e.g. the central bearing ring 32 or 33.

In practice, the two wheels are situated on common axis 39 in order to ensure that the axle assembly operates properly, as explained below. In this case, the two beam portions 36 and 37 situated on either side of the chassis fixing point 10 are made of a material such that each of them has opposite anisotropic elasticity in torsion to the other. In this manner, the torsion forces which are applied to the two portions 36 and 37 of the beam as seen from the two ends of the beam looking towards the fixing point 10 are anticlockwise for one portion, in this case as seen from the wheel 2, and clockwise from the other portion, in this case as seen from the wheel 3.

Figure 3:
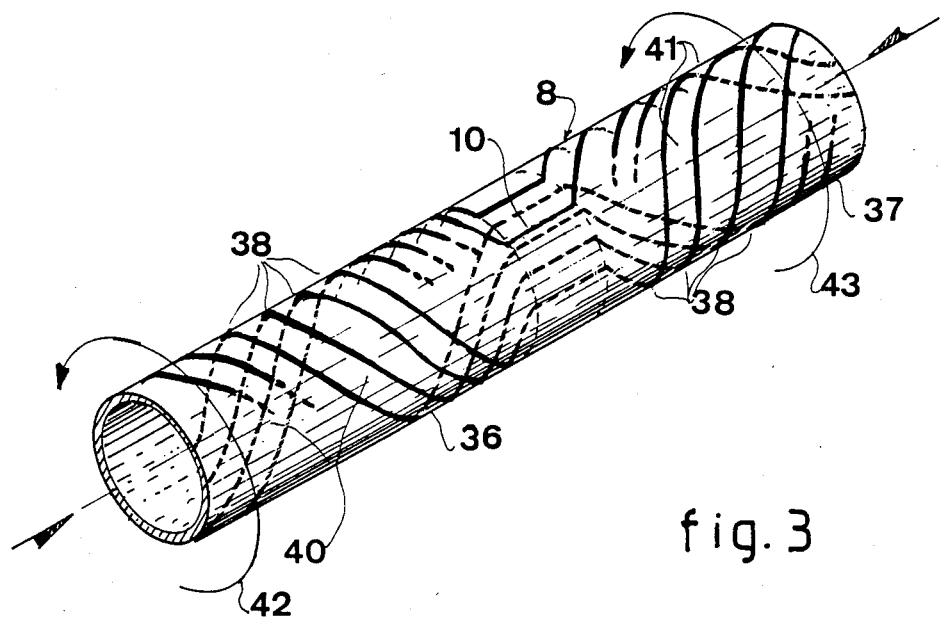
FIG. 3 is a fragmentary diagrammatic view of a component of the embodiment of an axle assembly shown in FIGS. 1 and 2.

In an advantageous embodiment the beam is made, as shown in FIG. 3, of composite material which is preferably in the form of a circular cylinder, comprising pluralities of spiral wound fibers 38 which are wound in one direction 40 for the portion 36 of the beam 8 and in the opposite direction 41 for the other portion 37. Under such conditions, if the beam is fixed, at least with respect to rotation, at its midpoint 10, then the anticlockwise rotation represented diagrammatically by arrow 42 working in torsion will be controlled under the best possible conditions since the fibers 38 of the winding 40 will tend to be put into traction, thereby controlling the torsion very effectively. The same applies to the clockwise rotation of the other end as shown diagrammatically at 43.

In this configuration, the axle assembly operates as follows:

As it moves over the ground, a vehicle provided with such an axle assembly will encounter obstacles that need to be overcome and absorbed with as small an effect as possible being transmitted to the chassis, while still allowing the wheels to remain in contact with the ground. Thus, when a wheel encounters an obstacle, the shock imparts displacement to the wheel in rotation about the beam axis, said displacement being transmitted by the link provided by the arm which acts as a lever arm. However, since the beam is prevented from rotating at some point, and preferably at its midpoint, and since the beam is made of a material whose torsion elasticity is anisotropic, in particular when the beam is made of composite material including wound fibers, the effect of the torsion applied thereto by the shock causes a very intense reaction force to be set up in the beam, which force increases sufficiently rapidly to control said torsion effect in a very short period of time. The wheel is thus returned to its original equilibrium position, i.e. the position in which the weight of the vehicle applied thereto is compensated by the torsion exerted on the portion of the beam connected thereto by the arm.

This unit beam configuration makes it possible to provide compact assemblies having minimum bulk. Further, the nature of the material from which the beam is made and the small number of component parts make it possible to obtain axle assemblies which are much lighter than prior art assemblies, which is the desired aim for improving motor vehicle efficiency.

Naturally, shock-absorbing means are associated with such a beam. Since shock-absorbing means are known per se, they are not described herein.

In the above-described embodiment, it is mentioned that the arms are fixed to the two ends of the beam 8. In some cases, the fixing means may comprise connection means having at least one degree of freedom in rotation about an axis substantially perpendicular to the ground over which the vehicle including such an axle assembly is likely to move. Such means make it possible to adjust so-called "wheel parallelism" and may be constituted, for example, by a fork or clevis coupling having its axis of rotation perpendicular to the ground. They also include means for locking said connection when the desired rotation has been obtained. The axle assembly may also include a coupling, possibly of the same type, at the opposite ends 17 and 18 of the arms in order to obtain rotations of the two wheels about axes substantially perpendicular to the ground so as to be able to steer a vehicle including such an axle assembly.

The embodiment shown in FIGS. 1 to 3 is advantageous for an axle assembly comprising one wheel on each side of the chassis, and the means for preventing the beam from rotating relative to the chassis may be constituted by any known physical means. However, the invention may advantageously be applied to axle assemblies comprising a plurality of wheels situated behind one another as found on trucks and similar vehicles in which said means for preventing substantially the middle of the beam from rotating relative to the chassis are obtained directly.

Figure 4:
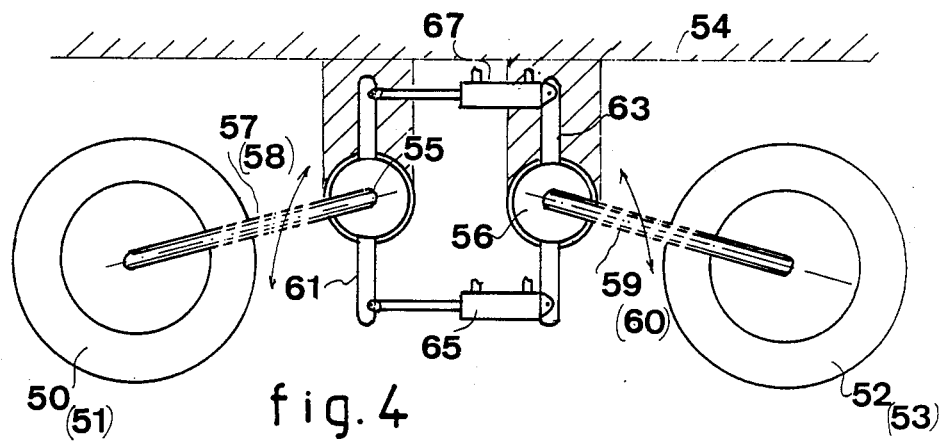
FIGS. 4 and 5 are diagrams of two other embodiments of axle assemblies in accordance with the invention.

FIG. 4 is a side view of a first embodiment of an axle assembly including four wheels 50–53 mounted in pairs on each side of a chassis 54 substantially in two parallel planes. The assembly then also comprises two unit beams 55 and 56 which are naturally associated, as in the assembly described above, with means for holding their two ends substantially on respective beam axes. However, this embodiment does not include any means having direct physical links between the midpoints of the beams and the chassis.

In order to prevent the two beams from rotating substantially in their middles, the axle assembly includes two cranks 61 and 63 associated with respective ones of the two beams 55 and 56 and extending along directions which are substantially perpendicularly to the axes of the beams. Each crank comprises two portions situated on either side of the axis of its beam, with the ends of the two portions of the crank associated with one of the beams being connected by links 65 and 67 to the corresponding ends of the two portions of the crank associated with the other beam. These two cranks 61 and 63 are fixed to the two beams 55 and 56 at the respective points thereof which are to be prevented from rotating relative to the chassis, i.e. at the midpoints 10 of each beam as defined with respect to the beam 8 in the embodiment shown in FIG. 1. The two cranks are thus situated in a plane perpendicular to the axes of the two beams and passing through the two fixed points.

In the embodiment shown in FIG. 4, the two wheels 50 and 52 situated one behind the other in the same plane lie on opposite sides of the pair of beams, and the beams are made of composite material such that the beam portions lying on the same side of the plane defined above and passing through the two cranks have oppositely-handed anisotropic elasticity. With this configuration, the two cranks 61 and 63 and the two links 65 and 57 constitute a convex quadrilateral.

Thus, there is no longer any need to connect the midpoints of the beams directly to the chassis. This connection is obtained indirectly by the action of the two pairs of force couples acting on the two ends of the beam under the weight of the chassis, or more exactly the weight of the vehicle including such an axle assembly, and the reaction of the wheels 50–53 against the ground, said couples being compensated by the opposing couples exerted by the links. The two pairs of wheels 50-53 thus take up an equilibrium position under the load of the chassis as transmitted to the beams by the bearings situated at their ends.

Each of the beams in the axle assembly shown in FIG. 4 functions in the same way as described with reference to FIG. 1. However, in the present embodiment, it is very easy to adjust the equilibrium position of the chassis relative to the ground. It is advantageous for the links 65 and 67 to be adjustable in length, e.g. by means of actuators. This configuration makes it possible to preposition the angles of the beams to angle values which are easily determined, and with such relative rotation of the two beams it is possible to vary the orientations of the arms 57-60, thereby varying the distance between the beams and the ground, i.e. controlling the equilibrium position of the vehicle.

In the above-described embodiment, the two wheels situated one behind the other on the same side of the chassis are situated at a relatively large distance apart even though the arms connecting the wheels to the beams are short in length, and in some cases it may not be possible to use such an embodiment.

Figure 5:
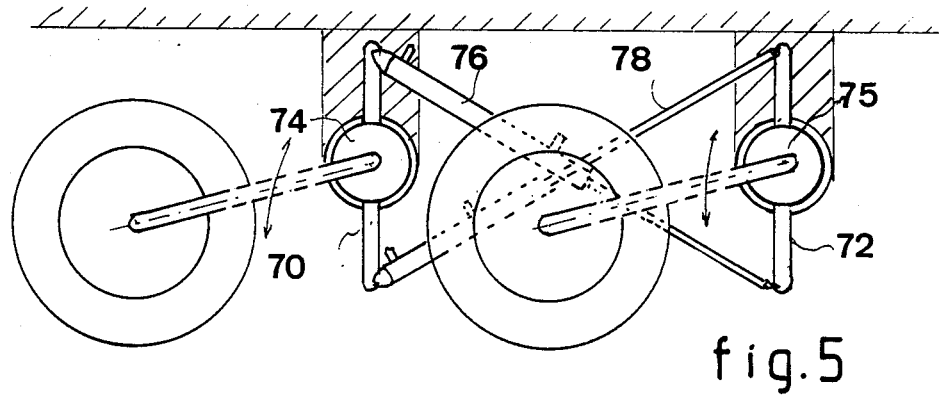

The embodiment shown in FIG. 5 makes it possible to place the wheels very close together one behind the other on either side of the two vehicles, with adjacent portions of the beams having same-direction anisotropic elasticity in this case.

In this embodiment, the cranks 70 and 72 associated with respective ones of the two beams 74 and 75 are interconnected by links 76 and 78 forming a crossed quadrilateral therewith. This embodiment does not give rise to any problems as to its operation and its advantages, which are readily deduced from the operation and advantages described above with reference to FIG. 4.

Figure 6:
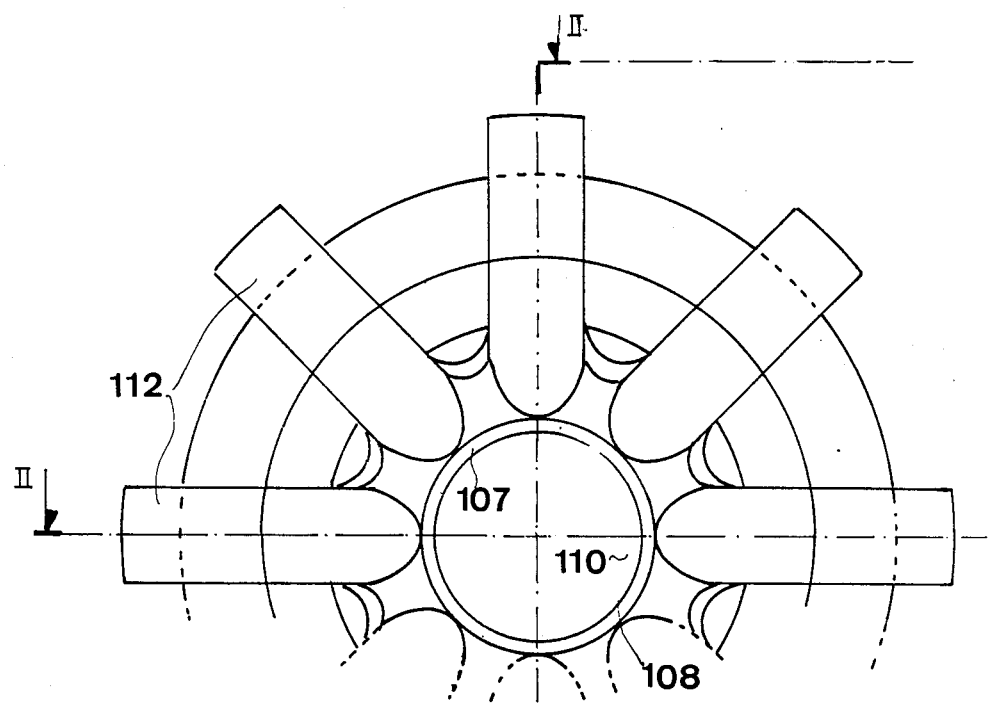
FIG. 6 is a fragmentary side view of one of the components used, in accordance with the invention, for constituting the system for fixing an arm on a beam in an axle assembly.

The embodiments shown in FIGS. 5 and 6 are particularly advantageously applicable for a triple axle assembly, i.e. an axle assembly comprising three pairs of wheels situated one behind the other on either side of the chassis. In this case, the three beams interconnecting pairs of wheels situated on opposite sides of the chassis may be interconnected by a set of cranks and links organized as a combination of the embodiments shown in FIGS. 4 and 5, or else as a series of two embodiments as shown in FIG. 5. A series of two embodiments as shown in FIG. 4 could give rise to difficulties, in particular with respect to the lengths of the links that would be required for one of the connections. However, a three-axle assembly in accordance with the invention is very easily transformed into a two-axle assembly. This transformation is performed by adjusting the lengths of the links so as to raise the pair of wheels associated with one of the beams off the ground. This type of axle assembly is particularly advantageous for use with trucks or trailers that may transport very heavy loads, since it enables them to run in a four-wheel configuration when not heavily loaded.

It should also be observed that in an axle assembly including only one unit beam, the means for preventing the central point of the beam from rotating relative to the chassis may be constituted by a crank fixed to the beam at this point and by a variable length link connecting the end of the crank to the chassis. Thus, by adjusting the length of the link it is possible to adjust the equlibrium position of the vehicle as described above.

As described with reference to FIGS. 4 and 5, both ends of the cranks connected to respective ones of the two beams are interconnected by two variable-length links. However, in some cases, in order to prevent the central point of each beam from rotating, it is possible to make use of only one link interconnecting the two cranks, with stabilization being obtained by the reaction force exerted on the wheels by the ground under the action of the weight of the vehicle having such an axle assembly. For example, in the embodiment shown in FIG. 4, it would be possible to omit one of the two links, e.g. the link 67. It would then advantageously be necessary to provide a reaction bearing situated close to the position where the crank is fastened to the beam in order to allow it to rock in a bore and thus absorb the deformation forces which are applied to the beam.

In addition, in an advantageous embodiment, both with an axle assembly including only one beam and with assemblies including a plurality of beams, each crank associated with each beam may be connected to the chassis 54 by an actuator, with each actuator being fed with energy under the control, for example, of an instruction-generating center, for the purpose of varying actuator length and thus the angular position of the beam so as to correct, in particular, the loaded equilibrium position of the vehicle.

Figure 7:
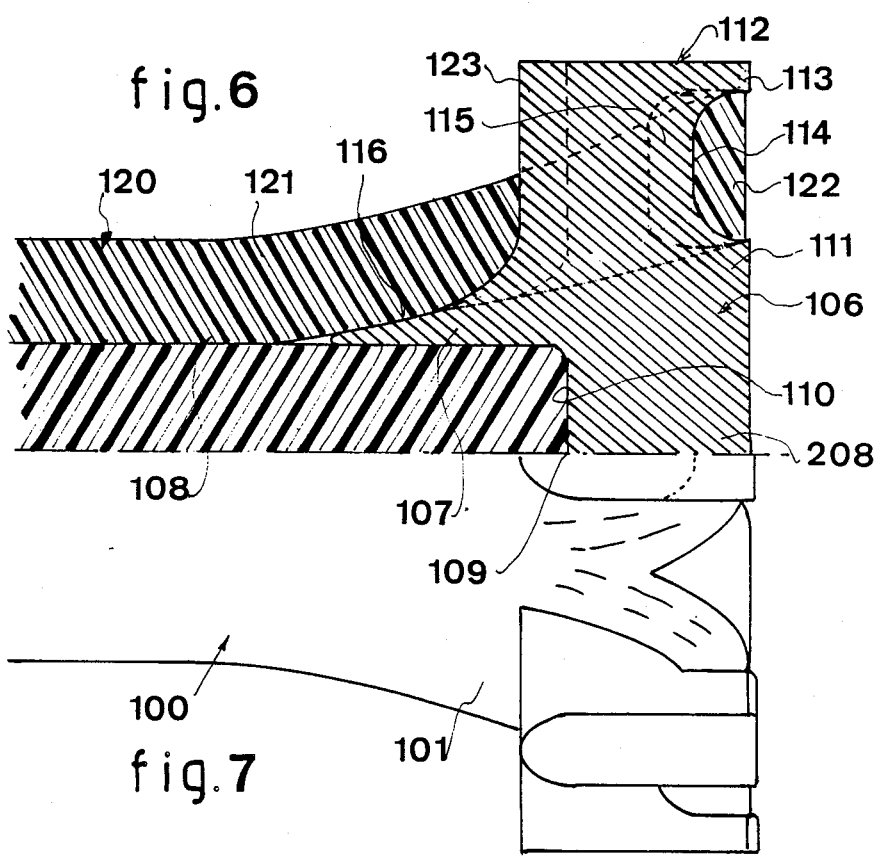
FIG. 7 is a view in partial section through the FIGS. 6 component in association with a beam.
Figure 8:
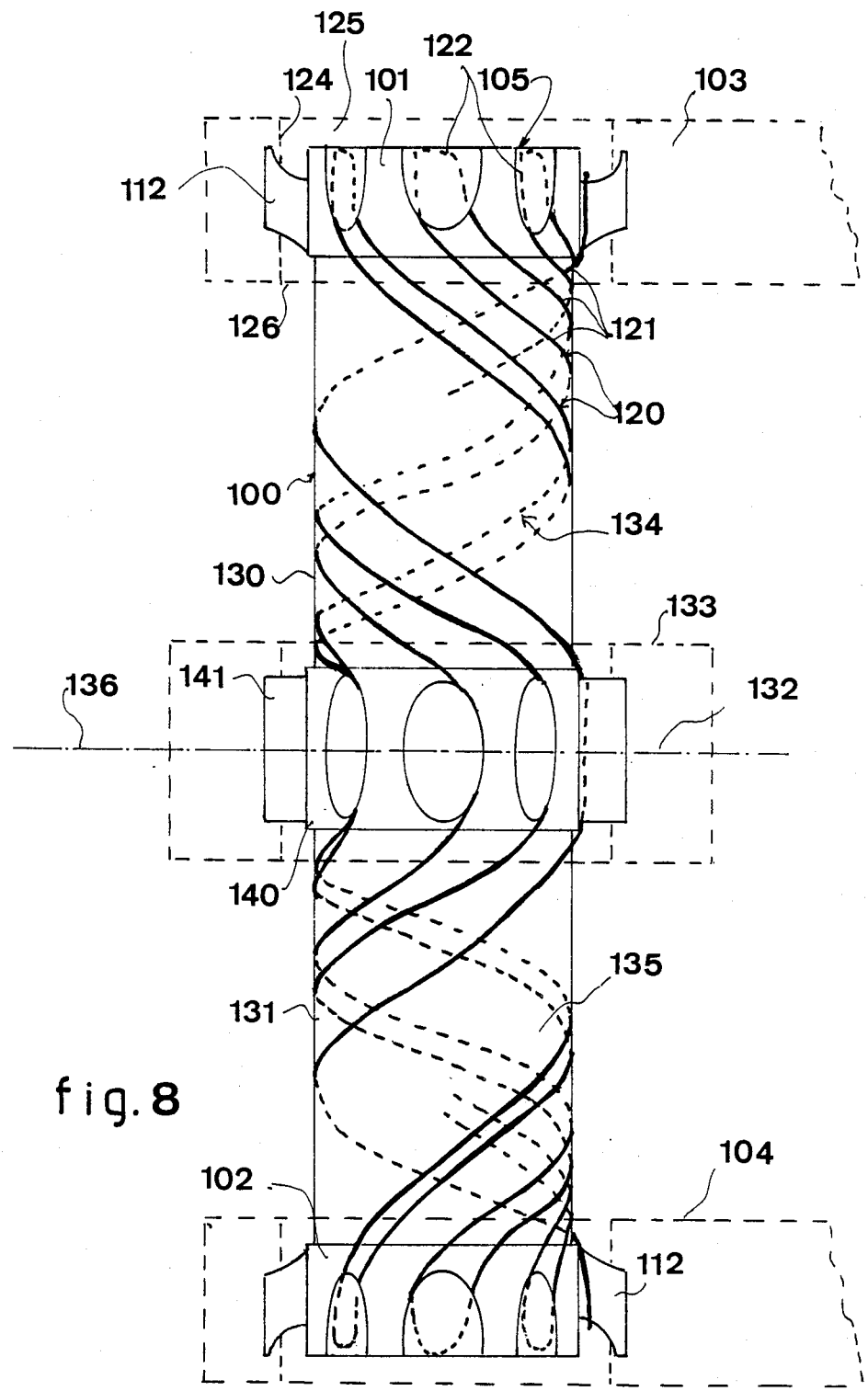
FIG. 8 is an overall diagram of an embodiment of an axle assembly in accordance with the invention and implementing the fixing system shown in FIGS. 6 and 7.

FIGS. 6 to 8 show another embodiment of an axle assembly in accordance with the invention. Since all three of these figures show the same embodiment, the same references are used therein to designate similar items regardless of the figure in which the items appear and regardless of the way in which the items are shown or in their scale.

The axle assembly shown in FIGS. 6 to 8 includes a unit beam 100 with two arms 103 and 104 at respective ones of its two ends 101 and 102, said wheels being omitted from the drawings in order to simplify them. Each arm 103 and 104 includes fixing means 105 comprising at least one sleeve 106 suitable for surrounding and contacting the beam 100 around at least a portion 107 of its side wall 108.

Advantageously, the sleeve 106 includes a reentrant portion 208 constituting a shoulder against the bottom 110 of which the face 109 at the end 101 of the beam 100 can come into abutment and held completely captive. There is at least one peg 112, and advantageously a plurality of pegs 112 as shown in the figures, projecting from the periphery 111 of the sleeve 106. These pegs 112 advantageously include, on their front portions 113 facing away from the beam 100 when the end 101 of the beam is received in the sleeve 106, notches 114 having rounded edges 115 in order to avoid having bruising or cutting contours. Naturally, the notches 114 serve to guide the fibers properly which, in the simplest embodiment may be wound around notchless pegs having round edges.

In an advantageous embodiment, the sleeve 106, and more particularly its portion 107 surrounding the side wall 108 of the end 101 of the beam, has an outside wall 116 which tapers in thickness away from the peg towards the middle of the beam.

Further, the means for fixing the arm 103 include at least one fiber 120 having a first portion 121 wound over the side wall 108 of the beam 100 and a second portion 122 wound at least in part around the peg 112 so that said fiber 120, and more particularly its portion 112, passes through the notch 114 in close contact with its rounded contours 115. Since the fibers 120 are likely to be subjected to high traction forces, the advantageous shape for the contours of the notch 114 prevent the formation of nicks which could create points of weakness causing the fibers to break.

Advantageously, the second portion 112 of the fiber 120 may have several turns wound round the peg and its end may be fixed to it by any means, e.g. polymerizable or thermosetting glues, etc. .... However, in order to ensure continuity and uniformity in the distribution of the forces transmitted from the arm 103 to the end 101 of the beam 100, the second portion 122 of the fiber may be wound, in turn, around the beam 100.

More particularly, in FIG. 8, the fiber 120 is shown as a continuous line in order to simplify and clarify the drawing. However, in industrial manufacture, the fixing system comprises a plurality of pegs 112, as shown in the figures, and there is a sufficient quantity of fibers 120 for obtaining the forces required for transmitting torsion, said fibers going round said plurality of pegs 112.

The pegs 112 should be of sufficient length to project at least in part 123 from the winding of fibers 120, said projecting parts 123 then constituting teeth suitable for fixing in complementary hollow teeth provided, for example, around the periphery 124 of a through housing 125 formed in the end 126 of an arm, e.g. the arm 103. The sleeve 106 may also be used for beam-fixing purposes, e.g. by means of screws, keys, welding, etc. ... .

In the context of the improved axle assembly of FIGS. 6 to 8, the two arms 103 and 104 are fixed to the two ends 101 and 102 of the beam by the means described above, essentially constituted by sleeves having shoulders, projecting pegs, and fibers wound around the beam after being wound around one of the pegs and passing, for example, through the notches 114.

In an advantageous embodiment, the two portions 130 and 131 of the beam situated on opposite sides of the point 132 which is connected to the chassis of a vehicle by means 133 preventing it from rotating, are each of them made of a material having torsion elasticity which is anisotropic in a direction opposite to the other portion. In this case, the beam 100 is made, for example, of a composite material including windings of fiber materials, said windings being constituted by substantially helical turns with the turns in each portion of the beam being oppositely-handed to those in the other.

Thus, in order to avoid damaging the torsion elasticity of such a beam, the fibers 120 as described above and passing round the pegs are also wound, in an advantageous embodiment, in the form of helical spirals having the same handedness as the winding of the fibers constituting the two portions of the beam and giving rise to the phenomenon of anisotropic torsion elasticity. In this case, the fibers 120 may be wound continuously over the two portions of the beam 130 and 131 so as to form a first winding 134 in one direction and a second winding 135 in the opposite direction, with the change of winding direction taking place substantially in a plane 136 defining the point 132 of the beam which is prevented from rotating relative to the chassis.

In an advantageous embodiment depending on the structure of the above-described fixing system, the change in winding direction may be obtained, for example, by means of a second sleeve 140 surrounding the beam 100 substantially level with the above-defined plane 136, said sleeve being fixed to the periphery of the beam by any appropriate means, in particular those described in the prior art mentioned in the introduction of the present description. This second sleeve 140 includes projecting portions 141 on its periphery forming pegs having rounded surface contours such that the fibers 120 can bear against said pegs and thus change winding direction, as shown in FIG. 3, thereby obtaining, on either side of the plane 136, two oppositely handed anisotropic torsion elasticities and more readily passing torque from their ends.

Such an embodiment thus makes it possible, industrially, to obtain an axle assembly comprising a unit beam which retains its anisotropic torsion elasticity and which, together with the arms, can constitute an industrial product capable of being mounted easily on the chassis of a motor vehicle.

Such an axle assembly operates in the same way as that described above. Its operation is therefore not described in greater detail herein. Nevertheless, it is specified that if the arm 103 is subjected to torsion when the wheel encounters an obstacle, the force is properly transmitted at least to the portion 130 of the beam 100 and torsion control is obtained by means of the pegs acting in traction on the fibers 120 and tending to tighten the windings about said portion 130. An identical phenomenon applies to the arm 104. The continuity of the fibers makes it possible to impart uniformity to the axle assembly as a whole and to ensure that the two arms are properly retained and accurately associated with the ends of the beam.

In an advantageous embodiment, the second sleeve 140 and its projecting portion 141 may be constituted by two sleeves identical to the first sleeve 106 but coupled together by their faces opposite to the bottoms 110 of their shoulders, so as to by symmetrical relative to said face. This embodiment further reduces the cost price of such an axle assembly.

There can be problems in fixing a composite beam to the chassis of a vehicle or to a crank or an arm as described above, in particular because one of the essential characteristics of a composite beam, namely its strength, may be lost if it is drilled. It is also practically impossible to weld fastening parts thereto, e.g. fixing tabs made of a conventional material such as steel.

Figure 9:
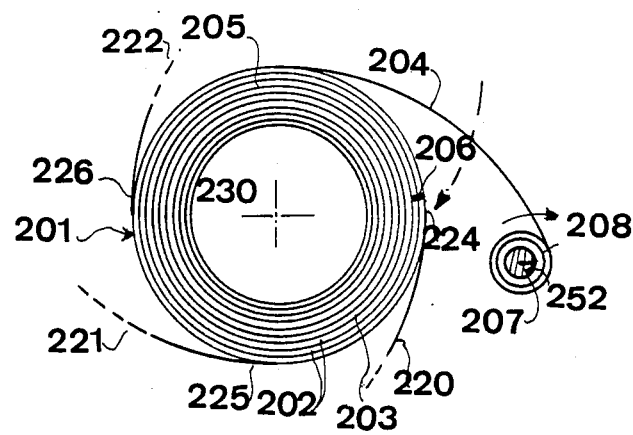
FIG. 9 is a diagram for explaining how the beam is fixed in an axle assembly in accordance with the invention.

FIG. 9 shows an implementation of a system for fixing a torsion beam in accordance with the present invention. It is initially specified that the beam is made by using the abovedescribed techniques with composite materials in order to constitute, for example, a solid or a hollow circular cylinder 201, as shown. This beam may be constituted, for example, by a winding of fibers 202, e.g. glass or carbon fibers, which are fixed to one another, e.g. by thermoplastic materials or by polymerizable resins.

On the periphery 203 of the beam, at the location where it is to be fixed and thus held as firmly as possible, a first end 206 of a fiber in the form of a tape 204 is wound in such a manner as to form a plurality of turns which are firmly pressed against the periphery of the beam. An excess thickness is formed with the remainder 207 of the tape which is not wound around the beam. This excess thickness is advantageously constituted, for example, by winding said end on itself to form a secondary winding 208.

When the secondary winding 208 is complete, it is brought down against the outside wall of the primary winding formed by the beam with the first end 206 of the tape 204 wound thereabout.

Figure 10:
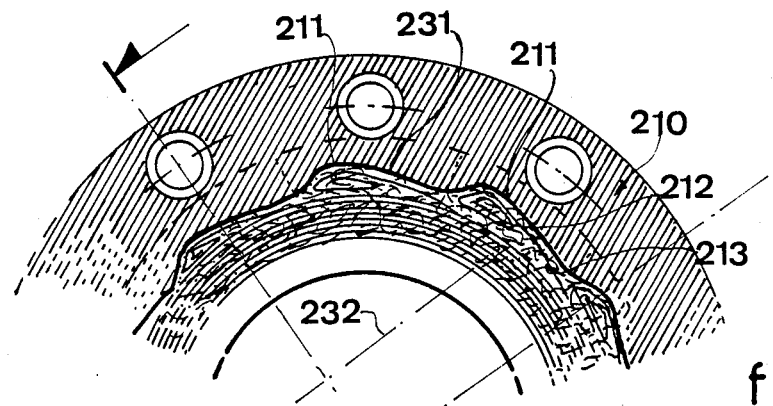
FIGS. 10 and 11 are perpendicular section views through one embodiment of a system in accordance with the invention for fixing a composite material torsion beam.
Figure 11:
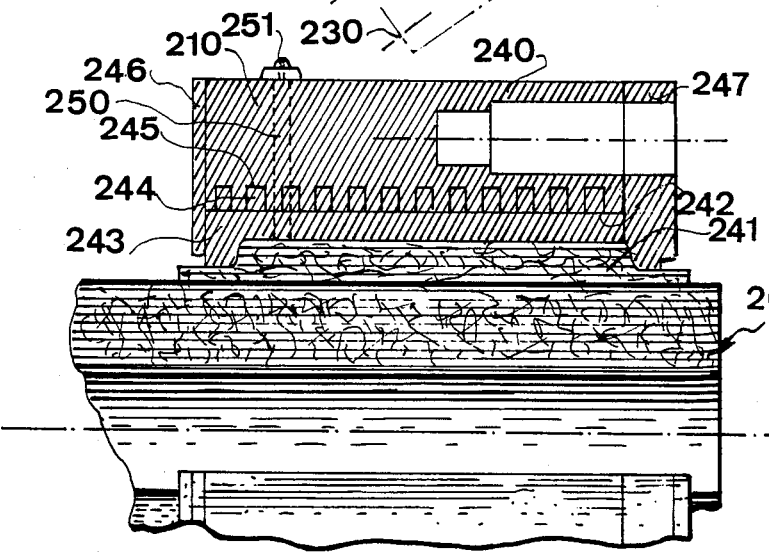

This secondary winding thus forms a projection from the periphery of the beam, which projection can be shaped to some extent to give it a specified shape, for example a shape as shown in FIGS. 10 and 11. This shape is determined so that the secondary winding 208 fits as closely as possible in the recess 211 provided in the part 210 made of a material which may be a metal such as steel and which is used as the part for connecting the beam to other components, e.g. the chassis of a vehicle. Thereafter, the above-mentioned thermosetting or polymerizable resin, for example, is cast into said recess containing the secondary winding 208, with the recess 211 acting as a mold for this purpose. In this way, the projection 212 made in this way is a perfect fit against the internal side surface 213 of the recess. The embodiment described above is merely an example. For example, the fibers such as glass fibers may be impregnated with resin prior to being wound.

In the above-described embodiment, only one example has been given of making a projection. However, it is important for the bonding to be as strong and as rigid as possible, in particular when holding a torsion beam.

Thus, in an advantageous embodiment, a plurality of first tape ends 220, 221, 222, ..., are wound simultaneously around the periphery of the beam 201 like the tape 204 in such a manner that said primary windings on the beam overlap one another. However, these windings are stopped at regularly spaced-apart locations 224, 225, 226, ..., and the free ends of the tapes are wound onto themselves as described above in order to form projections which are uniformly distributed around the periphery of the beam for fitting inside corresponding recesses 211 in the part 210.

As before, when the secondary windings are in their corresponding recesses 211, the bonding material is cast in order to fix the turns of each secondary winding and fill any spaces that may exist between said winding and the internal surface of each recess. Each projection can thus be a perfect fit against the internal sidewall of the corresponding recess 211.

As a result, the plurality of projections co-operating with the plurality of recesses provide a perfectly safe fixing with the retaining forces and particularly torsion forces being well distributed around the periphery of the beam 201.

The recesses may be of any shape. However, advantageously, and more particularly when the beam is intended to be subjected to torsion about its longitudinal axis 230, the projections are substantially sawtooth in shape having at least one gently sloping flank 231 such that the mid-perpendicular 232 of said flank passes close to the axis 230, or said flank is slightly concave in shape.

As for the connection part 210, it should be made of a material which is easily machined, thereby making it easy to connect to other components. It would alternatively be forged, or cast, and the selected material is generally steel.

In an advantageous embodiment, said retaining part 210 comprises a central portion 240 including a through bore 241 in whose wall 242 the above-defined recesses 241 are formed. These recesses may be machined directly in said wall. However, it is also possible to make a bore of greater nominal diameter and to line said bore with removable modular elements 243 which are juxtaposed side-by-side around its entire periphery, for example being held in place by means of pegs 244 engaging in corresponding orifices 245.

The central portion 240 is then capped by two end plates 246 and 247, with the end plate 247 being fixed, for example, prior to the polymerizable resin being cast as explained above.

However, in another embodiment, the resin may be inserted in the recesses, e.g. by means of an injection channel 250 and an inlet orifice 251.

The above-described system for fixing a torsion beam presents undeniable advantage over prior art systems. The secondary winding is easily adjusted so as to be accurately positioned relative to the corresponding recess, thereby increasing fixing safety, and since the polymerizable resin is cast into each recess, the fixing is further improved by plugging any interstices which may exist. There is no need to provide additional pegs, and the entire system is very simple to implement.

In the above-described embodiment, the projection or excess thickness is obtained by winding one end of the fiber onto itself. However, in order to economize the quantity of fiber and resin used, it may be preferable to clamp said end by means of a relatively bulky end piece 252 and then optionally wind fiber along said end piece, which end piece may be made of a conventional material such as iron or the like.

In the above-described embodiment, the material used for bonding the turns of the secondary windings together, i.e. the thermoplastic material or the polymerizable resin or the like, is cast into the recesses when the connecting part 210 is already in place. However, in order to perform said casting it has been shown that said part 210 needs to include special means, e.g. injection holes 250 which undoubtedly complicate its manufacture.

In order to avoid this drawback, it is possible to fix the excess thicknesses or secondary windings by using a template which acts as a mold since it has recesses identical to those of the connection part to which the beam is to be permanently fixed. The template then includes all of the means required for molding the projections in the final shape that they are to have for the purpose of entering into close association with the connection piece 210. When the molding is terminated, the template is removed and replaced by the piece 210 whose recesses then fit accurately onto the excess thicknesses obtained using the template. End plate 247 is then put into place in order to finish the piece 210, thereby locking the excess thicknesses in place and completing the fixing.

In the above advantageous implementation, the connection piece 210 can omit items which increase its cost price, such as the injection channels 250.

I claim:

1. An axle assembly for a vehicle including a chassis, at least two wheels suitable for contacting the ground, means for associating said two wheels with said chassis and for holding them in two substantially parallel planes, said means comprising a unit beam, having opposite ends, means for preventing a point situated substantially between the two ends of the beam from rotating relative to said chassis, two arms, means for fixing each arm substantially at one of its ends to a respective one of the two ends of the beam, and means for rotatably mounting respective ones of said two wheels to the opposite ends of said arms, wherein two portions of the beam situated on respective sides of said point are made of a material such that each of them has anisotropic torsion elasticity in the opposite direction.

2. An axle assembly according to claim 1, wherein said material is a composite material including spiral-wound fibers in the two portions of the beam with windings in opposite directions.

3. An axle assembly according to claim 1, wherein the means for preventing substantially a point of said beam from rotating relative to said chassis comprise a crank fixed to said beam substantially at said point thereof.

4. An axle assembly according to claim 3, wherein said crank is situated in a plane substantially perpendicular to the longitudinal axis of said beam.

5. An axle assembly according to claim 4, including means for connecting one end of said crank opposite a second end connected to said beam, to a reference point constituted by the chassis.

6. An axle assembly according to claim 5, wherein said means for connecting the end of said crank opposite from its end connected to said beam to a reference point are constituted by a link.

7. An axle assembly according to claim 6, wherein said link is an adjustable length link.

8. An axle assembly according to claim 4, including means for connecting one end of said crank opposite a second end connected to said beam, to a reference point constituted by the end of another crank connected to another beam.

9. An axle assembly according to claim 3, wherein said means for preventing substantially a point of said beam from rotating relative to said chassis and said means for fixing said arms to respective ends of said beam include fixing means comprising a winding on the periphery of said beam, said winding being of a determined length having a first end of a fiber in the form of a tape suitable for forming a primary winding, and a second, free end of said tape including means for forming an excess thickness, said excess thickness being pressed against the primary winding and being disposed in a recess formed in the periphery of a bore through a connection piece surrounding said beam.

10. An assembly according to claim 9, wherein said excess thickness is constituted by the free end of said tape wound onto itself in order to form a secondary winding.

11. An assembly according to claim 10, wherein said secondary winding is shaped after being wound so as to make it substantially identical in shape to said recess.

12. An assembly according to claim 9, wherein said recess has a sawtooth shape including a flank having a mid-perpendicular passing close to the axis of said beam.

13. An assembly according to claims 9, wherein said connection piece is constituted by a central portion having a through bore formed therein, said recess being provided in the side wall of said hole, and two end plates disposed at either end of said central portion in order to at least partially close the two ends of said recess.

14. An assembly according to claim 13, wherein said recess is made from removable modular components, said components lining said bore and including means for associating them with the side wall of said bore.

15. An assembly according to claim 14, wherein said association means are constituted by a male-female type engagement of studs suitable for co-operating with complementary housings.

16. An assembly according to claim 9, wherein said excess thickness is constituted by an end piece fixed to the free end of said tape and, said free end of said tape being wound around said end piece in order to form a volume of determined value.

17. An axle assembly according to claim 1, wherein said means for fixing at least one arm of an end of said beam comprise a sleeve surrounding said beam and in contact therewith, at least one peg projecting outwardly from and fixed to an outside wall of said sleeve, and at least one fiber having a first portion which is wound around said beam and a second portion at least in part surrounding said peg.

18. An axle assembly according to claim 17, wherein said sleeve includes a reentrant portion forming a shoulder which cooperates with a face of the end of said beam.

19. An assembly according to claim 17, wherein said peg includes a notch on a portion of a face of said peg which is opposite to a face of the peg facing the beam when the end of the beam is received in the sleeve, said notch having rounded edges.

20. An assembly according to claim 17, wherein the portion of said sleeve surrounding the side wall at the end of the beam itself has a wall of tapering thickness going away from the portion carrying said peg, towards a central portion of the beam.

21. An assembly according to claim 17, wherein the second portion of the fiber surrounds said peg in a plurality of turns, and further including means for fixing said turns to one another.

22. An assembly according to claim 17, wherein the end of the second portion of said fiber is wound around the beam.

23. An assembly according to claim 17, wherein since each of the two portions of the beam situated on either side of the point which is prevented from rotating relative to the chassis of a vehicle is made of a material having torsion elasticity which is anisotripic in a direction opposite to that of the other portion, the first portion of said fiber is wound in substantially helical turns around one of said beam portions in the opposite direction to its turns on the other portion.

24. An assembly according to claim 23, wherein the two first portions of the fibers wound respectively on the two portions of the beam form continuous fibers, with the change in winding direction being situated in a plane passing substantially through the point of the beam which is prevented from rotating relative to the chassis.

25. An assembly according to claim 24, further including means for holding said fibers where they change winding direction.

26. An assembly according to claim 25, wherein said means for holding said fibers at the change of winding direction are constituted by a second sleeve surrounding said beam substantially level with said plane, and means for fixing said second sleeve to the beam and wherein the periphery of said sleeve includes at least one rounded contour projecting portion such that the fibers bear against said projecting portion when changing winding direction.

27. An axle assembly for a vehicle comprising: a chassis; at least four wheels suitable for contacting the ground, means for associating said wheels with said chassis in pairs and for holding them respectively in two substantially parallel planes, said means for associating said wheels with said chassis in pairs and for holding them respectively substantially in two parallel planes including first and second unit beams; means for holding the ends of the beams respectively on two substantially parallel axes; means for preventing respective points situated between the two ends of the two beams from rotating relative to said chassis; two pairs of arms, each arm of each pair being fixed substantially at one of its ends to a respective end of one of said beams and having means for rotatably mounting a respective wheel at the opposite end of said arm, said means for preventing each of said beams from rotating relative to said chassis substantially at a point situated between its two ends being constituted by a crank associated with said beam substantially at said point and extending along a direction substantially perpendicular to the axis of said beam, the end of the crank associated said first beam being connected by a link to the end of the other crank associated with the second beam.

28. An axle assembly according to claim 27, wherein each crank comprises two portions situated on opposite sides of said beam axis, the ends of the two portions of the crank associated with a first one of the beams being connected by respective links to the ends of the portions of the other crank associated with the other beam, with the portions of the beams situated on the same side of the plane passing through said two cranks having opposite anisotropic elasticity with said links and said cranks forming a convex quadrilateral.

29. An axle assembly according to claim 27, wherein each crank comprises two portions situated on opposite sides of said beam axis, with the ends of the portions of the crank associated with a first one of the beams being connected by respective links to the ends of the portions of the other crank associated with the other beam, the portions of the beams situated on the same side of the plane passing through said two cranks having same direction anisotropic elasticity, with said links and said cranks forming a crossed quadrilateral.

* * * * *